July 9, 1935.  E. J. FLYNN ET AL  2,007,527
LITHOPONE MANUFACTURE
Filed Aug. 31, 1932
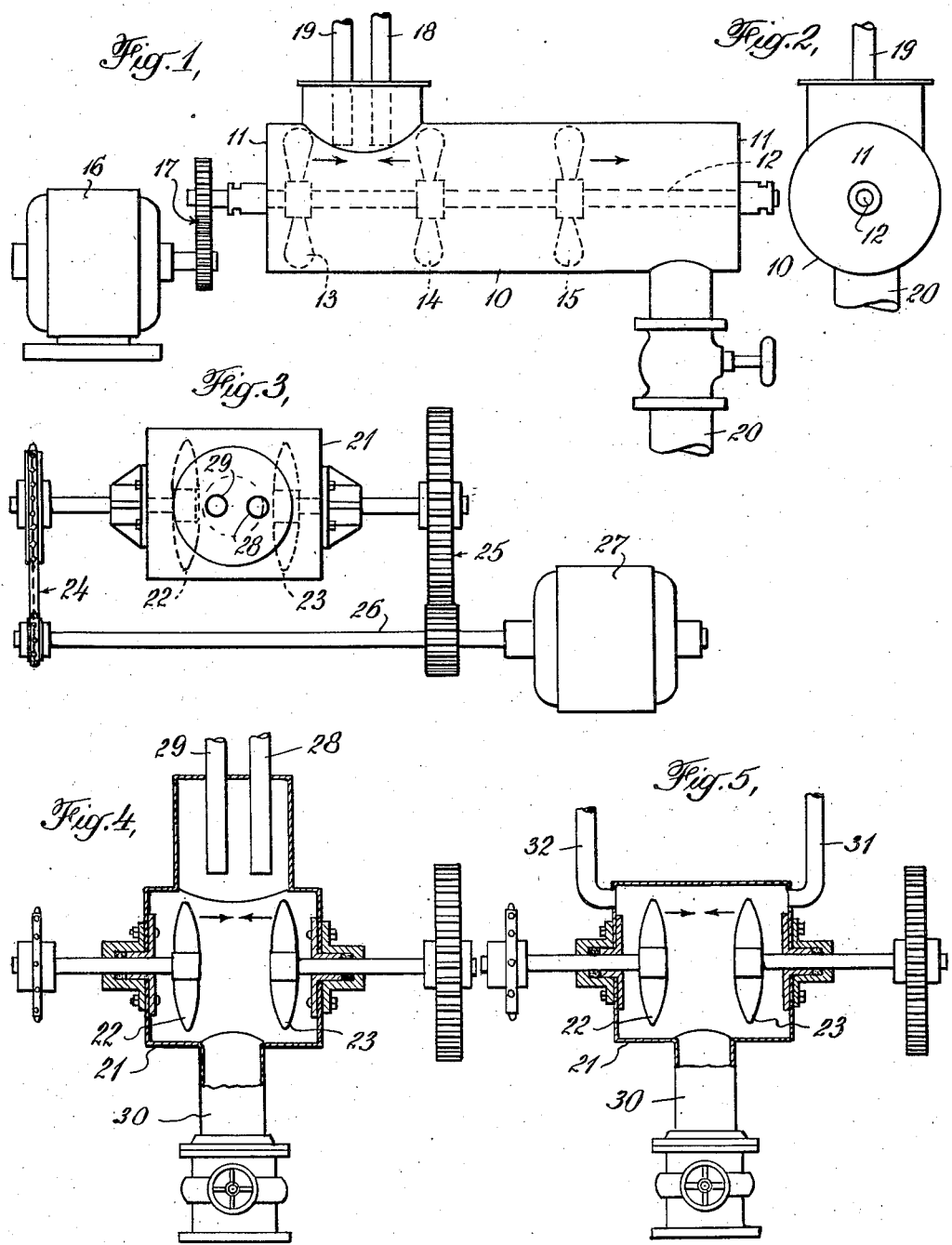

Patented July 9, 1935

2,007,527

UNITED STATES PATENT OFFICE 2,007,527

LITHOPONE MANUFACTURE

Edmund J. Flynn and George F. A. Stutz, Palmerton, and Carl B. Schertzinger, Slatington, Pa., assignors to The New Jersey Zinc Company, New York, N. Y., a corporation of New Jersey Application August 31, 1932, Serial No. 631,160

6 Claims. (Cl. 134—78)

This invention relates to the manufacture of lithopone, and has for its object the provision of certain improvements in lithopone manufacture.

Lithopone is a white pigment composed of zinc sulphide and barium sulphate. The normal lithopones of commerce contain about 30% zinc sulphide, while the so-called high strength lithopones contain a larger proportion of zinc sulphide. In the manufacture of lithopone, solutions of zinc sulphate and barium sulphide are mixed, usually in a large tank, and there results a coprecipitate of zinc sulphide and barium sulphate generally known as crude lithopone. The precipitate is washed, calcined, suddenly cooled or quenched, and ground to form the finished lithopone of commerce.

The precipitation of crude lithopone has heretofore been carried out in large vats or tanks of several hundred and even of several thousand gallons capacity. A customary practice has been to first introduce a predetermined quantity of the purified zinc sulphate solution or liquor into the precipitating tank, and to then add a predetermined quantity of the purified barium sulphide solution or liquor with constant stirring of the combined liquors. More recently, a continuous precipitating practice has come into use in which the zinc sulphate and barium sulphide liquors are continuously added to a substantially constant volume of crude lithopone pulp in the precipitating tank, while crude pulp is continuously withdrawn from the tank. In all of these heretofore customary precipitating practices, relatively large volumes of crude lithopone pulp are in process and the maintenance of constant and uniform precipitating conditions is extremely difficult, if not impossible.

In particular, in these heretofore customary precipitating practices, it is substantially impossible to secure uniform agitation throughout the contents of the large precipitating tank. It is the customary practice to stir the contents of these large tanks by means of centrally disposed rotary stirrers having blades extending nearly to the periphery of the tank. When rotating, the linear velocities of portions of the blades near the periphery of the tank are obviously higher than the linear velocities of other portions of the blades nearer the center of the tank. The liquid or pulp near the periphery of the tank is therefore more vigorously stirred than that nearer the center of the tank. This difference in degree of stirring or agitation results in a difference in the velocity with which the reacting liquors are mixed at different points in the tank. In particular, the mixing velocity is greater at the periphery of the tank than near the center. This difference in mixing velocity causes a difference in effective reaction velocity and a variation in the concentration of the reacting liquors and results in the formation of particles of precipitate varying greatly in size. Since the variation in degree of agitation (due to the difference in linear velocities of different portions of the stirrer blades) decreases as the angular velocity of the stirrer decreases, increased uniformity of agitation in a large precipitating tank may be promoted by relatively slower stirring (as described in United States Patent No. 1,817,183, patented August 4, 1931) with an attendant decrease in the degree of variation of size of the particles of precipitate.

Our present invention relates in part to a more effective means of securing uniform agitation of the reacting liquors, and, in consequence, greater uniformity of particle size of the crude lithopone precipitate. In particular, the invention contemplates a method of effecting agitation during precipitation which is at the same time both vigorous and uniform.

In the course of our researches and investigations we have determined that the optical properties of the lithopones of commerce are not as good as they might be. We have further determined that the inferior optical properties of the present day lithopones of commerce are, in large part at least, due to non-uniformity in size of the individual particles occasioned by non-uniform agitation during precipitation, and/or to the fact, discovered by us, that the barium sulphate particles are relatively too small in size. Thus, we have discovered that to possess the optimum optical properties the particles of barium sulphate in the finished lithopone should be larger than in the lithopone as heretofore made. We have further found that the barium sulphate particles should be of substantially uniform size and the zinc sulphide particles should likewise be of substantially uniform size.

It is well known that crude lithopone possesses inadequate hiding power and tinting strength for paint purposes and that the requisite hiding power is imparted to the lithopone in the course of the muffling or calcining operation. We have found that the muffling operation brings about this increase in hiding power by causing the disappearance and/or the growth of particles (initially formed by the precipitation) which are for the most part too fine to possess good hiding power. It has heretofore been recognized that a pigment of extremely fine particle size is deficient in hiding power, and that an increase in the particle size of such a pigment first leads to an increase in its hiding power, but that after a definite maximum hiding power has been obtained by increasing the particle size, any further increase in particle size is attended by a decrease in the hiding power. It, therefore, appears that the particles of crude lithopone are smaller in size than requisite for maximum hiding power (both with respect to the barium sulphate and the zinc sulphide particles), and the muffling operation serves as a means of increasing the particle size towards the optimum for maximum hiding power, as well as of promoting uniformity in particle size.

We have found, however, that such control of particle size as may be brought about by muffling is effective chiefly with respect to the zinc sulphide particles. This appears to be due to the fact that (1) the barium sulphate particles are not so readily increased in size by the application of heat as are the zinc sulphide particles, and (2) the particle size at which barium sulphate possesses maximum hiding power is greater than the particle size at which zinc sulphide possesses maximum hiding power (the optimum particle size for hiding power of a pigment varies inversely with its coefficient of light refraction, and the coefficient of light refraction of zinc sulphide is greater than that of barium sulphate). Thus, assuming that the precipitated particles of barium sulphate and zinc sulphide are of the same size in the crude lithopone, a muffling operation that will bring the zinc sulphide to its optimum particle size for hiding power will leave the barium sulphate particles too small, as is observed to be the case in commercial lithopones of the prior art. Any attempt to increase the barium sulphate particles to optimum hiding power size by more prolonged muffling or by muffling at a higher temperature results not only in decreasing the hiding power of the zinc sulphide by rendering it too coarse but also in producing a yellowish over-muffled lithopone.

The pigmentary properties of lithopone have heretofore been attributed to the zinc sulphide, and the barium sulphate has been regarded as a substantially inert filler or diluent of the zinc sulphide. We have found that the relative optical inertness of the barium sulphate in lithopone is due to the fact that its particles are too small when the crude lithopone is precipitated by the heretofore customary methods. The hiding power of lithopone can, we have discovered, be greatly increased by so controlling the precipitation of the crude lithopone that the finished lithopone contains barium sulphate approximating the particle size at which its hiding power is a maximum, while at the same time containing zinc sulphide approximating the particle size at which its hiding power is a maximum.

Based on these discoveries, our present invention involves an improved method of carrying out the precipitation of crude lithopone in consequence of which uniformity of particle size of the finished lithopone is assured and by appropriate control of which the average particle size of the finished lithopone may be varied at will through a considerable range. Thus, the method of the invention enables the production of a finished lithopone in which the zinc sulphide particles and the barium sulphate particles, respectively, approach perfect uniformity of particle size and are of any desired particle size.

The constant uniform mixing of the reacting solutions or liquors in such a way as to maintain the concentration of the precipitating liquors constant may be obtained in a number of ways. It is our preferred practice to obtain such constant uniform mixing by running the streams of zinc sulphate and barium sulphide liquors into a precipitating vessel or container of relatively small volume, and provided with an efficient propeller type of agitator. The form and rate of rotation of this agitator are so adjusted to the rate of flow of the liquors through the small vessel that the precipitation is completed within the vessel. In consequence, the liquors enter the small precipitating vessel at their full degree of concentration and leave the precipitating vessel, after traversing a relatively short path, at substantially zero concentration of zinc sulphate and at a low concentration (or even zero concentration) of barium suphide liquor. This sharp drop in concentration within a short distance (which may be described as a steep concentration gradient) is important since the conditions of precipitation are rendered more uniform in consequence thereof.

The rate at which precipitation takes place is dependent upon the following variables:
1. Concentration of the reacting or precipitating liquors.
2. Rate of flow of liquors through the precipitating vessel.
3. Agitation of liquors in the precipitating vessel.
4. Size of the precipitating vessel.
5. Temperature of the liquors.
6. Composition of the liquors.

Appropriate regulation and control of these variables effects the control of the optical properties of the finished lithopone contemplated by the invention. Thus, a variation in the speed of the agitator during precipitation of the crude lithopone results in a variation in the optical properties of the finished lithopone. For example, at any fixed concentration of zinc sulphate and barium sulphide liquors used for the precipitation, there is a definite speed of mixing at which a lithopone of proper particle size characteristics, and therefore of optimum color, brightness and hiding power, is obtained. For another concentration of zinc sulphate and barium sulphide liquors, another speed of mixing may be found at which the same proper particle size characteristics, and therefore optimum color, brightness and hiding power, are obtained.

In Figs. 1 and 2 of the accompanying drawing, we have diagrammatically illustrated a side and end elevation, respectively, of an apparatus adapted for the practice of the invention. Figures 3 and 4 diagrammatically illustrate another form of apparatus adapted for practicing the invention, and Fig. 5 diagrammatically illustrates a slightly modified construction of the apparatus of Figs. 3 and 4.

The precipitating apparatus illustrated in Figs. 1 and 2 of the drawing comprises a cylindrical vessel 10 having closed ends 11 in which is rotatably mounted a shaft 12 carrying three propeller agitators 13, 14 and 15. The blades of the end propellers 13 and 15 are designed to impel the slurry towards the right or discharge end of the vessel 10, while the blades of the intermediate propeller are designed to impel the slurry in the opposite direction. The shaft 12 is adapted to be driven at varying speeds by an electric motor 16 and a reducing gear train 17. In an apparatus of this type which we have successfully used in practice, the speed range of the shaft 12 could be varied from 371 to 1114 R. P. M.

Barium sulphide liquor and zinc sulphate liquor are continuously introduced into one end of the vessel 10 through pipes 18 and 19, respectively. The crude lithopone pulp precipitated in the vessel is continuously withdrawn through a valved outlet 20. In operation the vessel 10 is preferably maintained completely full of the crude lithopone pulp or slurry by appropriate regulation of the valved outlet 20. In this apparatus, the streams of zinc sulphate and barium sulphide liquors are run into the vessel 10 in close proximity to one another.

The precipitating apparatus illustrated in Figs. 3 and 4 comprises a cylindrical vessel 21 somewhat shorter in length than the vessel 10. Propeller agitators 22 and 23 are appropriately mounted within the vessel 21 with their blades designed to impel the slurry towards one another. Thus, the propellers 22 and 23 may be rotated in opposite directions by a chain drive 24 and a gear drive 25, respectively, driven from a common shaft 26 of an electric motor 27. The barium sulphide liquor and the zinc sulphate liquor are continuously introduced through pipes 28 and 29 respectively into the top of the vessel 21 and in front of the propellers 22 and 23. The crude lithopone pulp precipitated in the vessel 21 is continuously withdrawn through a valved outlet 30 at the bottom of the vessel.

In the apparatus illustrated in Fig. 5 of the drawing the barium sulphide liquor and the zinc sulphate liquor are continuously introduced through pipes 31 and 32, respectively, into the top of the vessel behind the propellers 23 and 22, respectively.

In practicing the invention in the apparatus illustrated in the accompanying drawing, we have obtained satisfactory results where the volume of combined barium sulphide and zinc sulphate liquors introduced into the precipitating vessel per minute is approximately three times the volume of the combined liquors maintained in that vessel. In general, we would say as a result of our investigations that the volume of combined barium sulphide and zinc sulphate liquors flowing per minute into the body of liquor in which precipitation takes place may be from about 0.1 to 25 times the volume of that body of liquor, although we wish it to be understood that we state these figures merely by way of illustration and without any intention of limiting or restricting our invention thereto.

The following specific example of the practice of the invention in the apparatus of Figs. 1 and 2 is given merely as illustrative and in no sense restrictive. The shaft 12 was operated at a speed of 540 R. P. M. The vessel 10 had a capacity of 39.4 gallons and the liquors were run through the vessel at the rate of 94 gallons per minute. The zinc sulphate liquor had a concentration of 26° Bé. and the barium sulphide liquor a concentration of 15° Bé. The temperature of precipitation was 65° C. The pulp as discharged from the vessel was slightly alkaline, showing a very faint pink coloration to phenolphthalin indicator. The pulp was end-pointed according to United States Patent No. 1,411,645; the end-point showing 1.6 cc. titration of 0.1 N. iodine on a 25 cc. sample for SH and 4.0 cc. titration of 0.25 N. HCl on a 250 cc. sample for OH. The lithopone was calcined in vertical muffles at a temperature of 835° C. It was subsequently quenched in water, ground in pebble mills, filtered, dried and disintegrated in the customary manner.

The improved properties of lithopone made in accordance with the invention are indicated by the following comparison of such a lithopone (A) with a lithopone (B) made by the heretofore customary batch process in a large precipitating tank.

| Sample | Percent tinting strength | Hiding power | | Oil absorption |
| --- | --- | --- | --- | --- |
| | | 90% brightness | 80% brightness | |
| Lithopone B | 102 | 26.2 | 41.4 | 4.1 cc. |
| Lithopone A | 113 | 29.2 | 46.8 | 3.6 cc. |
| Lithopone B | 102 | 26.2 | 41.4 | 4.1 cc. |
| Lithopone A | 119 | 28.1 | 45.7 | 3.5 cc. |

While the expressions "hiding power" and "tinting strength" are not necessarily synonymous, it is possible in the practice of this invention to obtain both improved hiding power and improved tinting strength. However, wherever an improvement in hiding power is indicated an improvement in tinting strength may also be obtained by the proper practice of the method of the invention, and vice versa.

If any two of the three factors (concentration of the precipitating liquors, rate of flow of the liquors through the precipitating vessel, and agitation of the liquors in the precipitating vessel) be maintained constant, while the other factor is varied, the varied factor has a certain optimum critical value at which the crude lithopone thereby produced yields a finished lithopone of maximum and substantially improved hiding power. Thus, for any particular speed of revolution of the agitator with a constant rate of flow through the precipitating vessel, there is a critical concentration of the zinc sulphate liquor and/or the barium sulphide liquor, for obtaining maximum hiding power in the finished lithopone. Again, for any particular concentration of the precipitating liquors with a constant speed of revolution of the agitator, there is a critical rate of flow through the precipitating vessel for obtaining maximum hiding power in the finished lithopone. Again, for any particular concentration of the zinc sulphate liquor and/or the barium sulphide liquor, with a constant rate of flow through the precipitating vessel, there is a critical speed of revolution of the agitator, and hence critical speed of mixing of the reacting liquors, for obtaining maximum hiding power in the finished lithopone. The effect of such variation in each of these three factors is illustrated in the following tables:

*Table I*

Effect of varied $ZnSO_4$ concentration on the tinting strength of lithopone. (Speed of agitation constant at 1300 R. P. M.; rate of lithopone slurry flow, constant at 6.3 liters per minute.)

| $ZnSO_4$ concentration °Bé. | Specific gravity | Tinting strength, in % of standard |
| --- | --- | --- |
| 10 | 1.0741 | 116 |
| 20 | 1.1600 | 123 |
| 50 | 1.5263 | 116 |

Table II

Effect of varied rate of flow of the lithopone slurry on the tinting strength of lithopone.
(Speed of agitation constant at 1300 R. P. M.; concentration of ZnSO₄ liquor constant at 27° Bé.)

| Rate of flow of slurry, liters per minute | Tinting strength of lithopone in % of standard |
|---|---|
| 2 | 112 |
| 7 | 119 |
| 10 | 117 |

Table III

Effect of varied speed of agitation on tinting strength.
(Rate of slurry flow constant at 6.3 liters per minute; concentration of ZnSO₄ liquor constant at 27° Bé.)

| Speed of agitation in R. P. M. of stirrers | Tinting strength of lithopone, in % of standard |
|---|---|
| 340 | 116 |
| 1050 | 121 |
| 2500 | 115 |

The critical speed of revolution of the agitator, and hence the velocity of mixing, at which the hiding power of the finished lithopone is at a maximum, increases as the concentration of the zinc sulphate liquor and/or the barium sulphide liquor increases.

The method of our present invention accordingly involves control of the rate at which precipitation takes place, and hence control of the particle size characteristics of the finished lithopone, by proper mutual adjustment of (1) the concentration of the precipitating liquors, (2) the rate of flow of the liquors through the precipitating vessel, and (3) the degree of agitation of the liquors in the precipitating vessel. If any two of these three factors are kept constant (at practicable values), an improved finished lithopone may be obtained by a proper adjustment of the third factor to the neighborhood of the critical value at which optimum values of hiding power of the finished lithopone are obtained. It is to be understood that this mutual adjustment of the three factors is entirely dependent on the method of securing uniform agitation which is likewise an element of the invention. In the heretofore customary methods of precipitating crude lithopone, the degree of agitation varies at each point in the precipitating tank, so that the degree of agitation has no definite value which could be adjusted to the other two factors or to which the other two factors could themselves be adjusted.

It has been found that such control of the aforementioned three variables as yields a finished lithopone of improved hiding power also yields a lithopone of improved color and brightness. With appropriate regulation and control of the three variables, a finished lithopone is obtained possessing an improved hiding power averaging 20% higher than that possessed by present day commercial lithopones of the same zinc sulphide content.

The method of the present invention not only enables the production of a uniform lithopone product of superior optical properties, but effects a very substantial reduction in the precipitating equipment and the plant space necessary for the same. Heretofore, a lithopone plant has required several large precipitating tanks, of several hundred or several thousand gallons capacity each. By the practice of the present invention, these precipitating tanks may be dispensed with, and the precipitation carried out in a continuous manner in relatively small precipitating chambers or vessels, of only a few gallons capacity. This becomes possible since the volume of precipitating liquors introduced per minute into the precipitating vessel may be several times the volume of the precipitating vessel itself.

In the commercial practice of the invention preliminary determinations should be made of the effects of varying liquor concentrations, of varying rates of flow of liquor through the precipitating vessel, and of varying degrees of agitation upon the hiding power of the finished lithopone, with the view of determining the optimum values of these variables for optimum hiding power. The precipitation of the crude lithopone is then carried out with appropriate control of any combination of the three variables (liquor concentration, rate of flow, and degree of agitation) in accordance with the preliminary determinations. In this manner the concentration of the precipitating liquors (and in practice this usually means the concentration of the zinc sulphate liquor) is properly correlated with the rate of flow of the liquors through the precipitating vessel and with the degree of agitation of the body of the combined liquors in which precipitation takes place to produce the desired optimum optical properties in the finished lithopone.

In addition to the regulation and control characteristic of the present invention, it is our preferred practice to further control the precipitating operation in accordance with the principles disclosed in United States Patents Nos. 1,411,645, 1,759,115 and 1,759,116. The crude lithopone produced according to the invention may be advantageously muffled in accordance with the method disclosed in United States Patents Nos. 1,411,646 and 1,411,647.

With appropriate control of the compositions, concentrations, and relative rates of flow of the zinc sulphate and barium sulphide liquors into the precipitating vessel, the end-point of the precipitating reaction may be so regulated and controlled that the crude lithopone pulp discharged from the precipitating vessel is suitable for immediate and direct dehydration. If desired, however, the crude lithopone pulp may be discharged from the precipitating vessel into finishing or storage tanks (with constant stirring), where the end-point of the precipitating reaction may be accurately adjusted and/or where the crude pulp may be held in storage until such time as the operating conditions of the plant call for its dehydration.

This application is a continuation in part of an application filed by us on December 21, 1929, Serial No. 415,821.

We claim:

1. The improvement in the manufacture of lithopone which comprises continuously introducing barium sulfide and zinc sulfate solutions of constant concentrations at a constant rate into a precipitating vessel that is relatively small compared with the large precipitating tanks conventionally employed, vigorously agitating said solutions within the small vessel to obtain substantially uniform mixing throughout the entire precipitating vessel, maintaining said uniform mixing at a predetermined rate adapted to yield a precipitate containing zinc sulfide particles that in the final lithopone product are substantially uniform in size and closely approximate the particle size required for maximum hiding power and tinting strength, continuously withdrawing the resulting pulp containing a crude precipitate of zinc sulfide and barium sulfate from said vessel, filtering said crude precipitate from said pulp, and calcining the filtered crude precipitate.

2. In the manufacture of lithopone by flowing barium sulfide and zinc sulfate liquors continuously into a precipitating vessel, the improvement which comprises conducting the precipitation step in a vessel that is relatively small compared with the large precipitating tanks conventionally employed while vigorously agitating the barium sulfide and zinc sulfate liquors within said vessel to obtain substantially uniform mixing velocities at all points therein at all times, maintaining said uniform mixing in the small vessel at a predetermined rate adapted to yield a precipitate containing zinc sulfide particles that in the final lithopone product are substantially uniform in size and closely approximate the particle size required for maximum hiding power and tinting strength, continuously withdrawing the resulting pulp of crude precipitate at substantially zero concentration of zinc sulfate and at a low concentration of barium sulfide liquor from the precipitation vessel, regulating the rate of withdrawal of the pulp from the vessel to hold the volume of material contained in the vessel substantially constant, filtering the resulting crude precipitate of zinc sulfide and barium sulfate, and calcining the filtered crude precipitate.

3. The improvement in the manufacture of lithopone which comprises carrying out the precipitation of the crude lithopone by continuously introducing the barium sulfide and zinc sulfate liquors into a body of the combined liquors in a vessel that is relatively small compared with the large precipitating tanks conventionally employed, the volume of said liquors introduced per minute being 0.1 to 25 times the capacity of said vessel, continuously agitating the body of combined liquors to provide substantially uniform mixing velocities at all points within the small vessel at all times, maintaining said uniform mixing at a predetermined rate adapted to yield a precipitate containing zinc sulfide particles that in the final lithopone product are substantially uniform in size and closely approximate the particle size required for maximum hiding power and tinting strength, continuously withdrawing the resulting crude lithopone pulp from said body of combined liquors at such a rate as to maintain the volume of said body substantially constant, filtering the resulting crude precipitate of zinc sulfide and barium sulfate, and calcining the filtered crude precipitate.

4. The improvement in the manufacture of lithopone which comprises carrying out the precipitation of the crude lithopone by continuously introducing the barium sulfide and zinc sulfate liquors into a body of the combined liquors confined within a vessel that is relatively small compared with the large precipitating tanks conventionally employed, the volume of liquors introduced per minute being several times the capacity of said vessel, continuously agitating the body of pulp to provide substantially uniform mixing velocities at all points within said vessel at all times, maintaining said uniform mixing at a predetermined rate adapted to yield a precipitate containing zinc sulfide particles that in the final lithopone product are substantially uniform in size and closely approximate the particle size required for maximum hiding power and tinting strength, withdrawing the resulting crude lithopone pulp from said body of liquor at such a rate as to maintain the volume of said body substantially constant, filtering the resulting crude precipitate of zinc sulfide and barium sulfate, and calcining the filtered crude precipitate.

5. In the manufacture of lithopone by flowing zinc sulfate and barium sulfide liquors continuously into a precipitating vessel, the improvement which comprises conducting the precipitation step within a vessel that is relatively small compared with the large precipitating tanks conventionally employed, mixing the precipitating liquors within the small vessel so that they receive a vigorous and substantially uniform degree of agitation throughout their entire body, said mixing being sufficient to complete the reaction between the barium sulfide and zinc sulfate liquors promptly so that there is a sharp drop in their concentration within a short distance of movement of the reacting liquors within the small vessel, maintaining said uniform mixing at a predetermined rate adapted to yield a precipitate containing zinc sulfide particles that in the final lithopone product are substantially uniform in size and closely approximate the particle size required for maximum hiding power and tinting strength, continuously withdrawing the resulting crude lithopone pulp from the vessel, filtering the resulting crude precipitate of zinc sulfide and barium sulfate, and calcining the filtered crude precipitate.

6. The improvement in the manufacture of lithopone wherein zinc sulfate and barium sulfide solutions are continuously conducted into a precipitation vessel and the resulting pulp is continuously removed therefrom, which comprises continuously conducting the zinc sulfate and barium sulfide solutions at substantially constant concentrations into a precipitation vessel that is relatively small compared with the large precipitating tanks conventionally employed, vigorously stirring said reacting solutions in the small vessel with a lineal stirring velocity that is substantially equal and constant in all parts of the mixture, maintaining said equal and constant stirring at a predetermined rate adapted to yield a precipitate containing zinc sulfide particles that in the final lithopone product are substantially uniform in size and closely approximate the particle size required for maximum hiding power and tinting strength, continuously withdrawing the resulting crude lithopone pulp from the vessel, filtering the resulting crude precipitate of zinc sulfide and barium sulfate, and calcining the filtered crude precipitate.

EDMUND J. FLYNN.
GEORGE F. A. STUTZ.
CARL B. SCHERTZINGER.